United States Patent
Muth

(10) Patent No.: US 7,937,516 B2
(45) Date of Patent: May 3, 2011

(54) INTEGRATED CIRCUIT WITH LIN-PROTOCOL TRANSMISSION

(75) Inventor: Matthias Muth, Stelle (DE)

(73) Assignee: NXP B.V., Eindhoven (NL)

(*) Notice: Subject to any disclaimer, the term of this patent is extended or adjusted under 35 U.S.C. 154(b) by 1301 days.

(21) Appl. No.: 10/534,164

(22) PCT Filed: Oct. 30, 2003

(86) PCT No.: PCT/IB03/04838
§ 371 (c)(1),
(2), (4) Date: May 5, 2005

(87) PCT Pub. No.: WO2004/044764
PCT Pub. Date: May 27, 2004

(65) Prior Publication Data
US 2006/0059276 A1    Mar. 16, 2006

(30) Foreign Application Priority Data
Nov. 9, 2002 (DE) .................. 102 52 165

(51) Int. Cl.
G06F 13/14 (2006.01)
G06F 3/00 (2006.01)
G06F 13/12 (2006.01)
G06F 13/38 (2006.01)

(52) U.S. Cl. .............. 710/305; 710/16; 710/71

(58) Field of Classification Search .......... 710/16, 710/71, 305
See application file for complete search history.

(56) References Cited

U.S. PATENT DOCUMENTS

| | | | | | |
|---|---|---|---|---|---|
| 4,740,754 A | * | 4/1988 | Finger | ............... | 324/428 |
| 4,761,824 A | * | 8/1988 | Saito | ............... | 455/127.1 |
| 4,951,776 A | * | 8/1990 | Jeter | ............... | 180/287 |
| 5,008,902 A | * | 4/1991 | Key et al. | ............... | 375/225 |
| 5,200,742 A | * | 4/1993 | Ikezaki | ............... | 340/2.1 |
| 5,485,059 A | * | 1/1996 | Yamashita et al. | ............... | 315/307 |
| 5,517,505 A | * | 5/1996 | Buchholz et al. | ............... | 370/350 |
| 5,778,002 A | * | 7/1998 | Werle | ............... | 370/474 |

(Continued)

FOREIGN PATENT DOCUMENTS
EP    1 206 092 A2    5/2002
(Continued)

OTHER PUBLICATIONS

"Electrical Engineering Glossary Definition for Vcc", Maxim IC, retrieved from the Internet on Nov. 5, 2007 at <http://www.maxim-ic.com/glossary/index.cfm/Ac/V/ID/943/Tm/VEE/In/en>, p. 1.*

(Continued)

Primary Examiner — Faisal M Zaman

(57) ABSTRACT

The invention relates to an integrated circuit having a system base chip of the kind usually provided for performing transmitting and/or receiving functions at a node that is coupled to a vehicle data bus. In an example embodiment, there is an integrated circuit having a system base chip that has basic functions for a transmitting and/or receiving system for a vehicle data bus, namely at least a system voltage supply, a system reset and a monitoring function An interface circuit that, in a self-contained fashion, runs at least parts of a data bus protocol, and in particular, the LIN (Local Interconnect Network) protocol, that performs detection of the bit-rate of received data, and that is capable of passing on at least one received or transmitted byte. A serial/parallel converter makes use in its conversion of the bit-rate detected by the interface circuit.

4 Claims, 1 Drawing Sheet

U.S. PATENT DOCUMENTS

Figure 1:
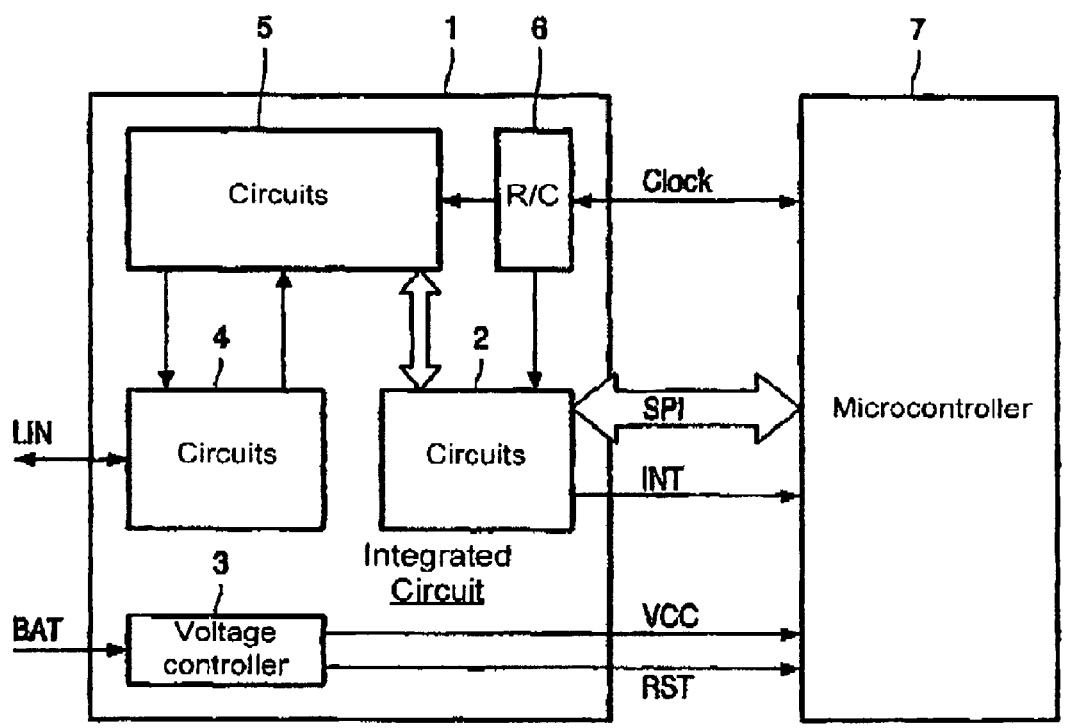

| | | | |
|---|---|---|---|
| 6,049,888 A | | 4/2000 | Chanoux |
| 6,262,560 B1 * | | 7/2001 | Lionberg et al. ............ 320/103 |
| 6,292,045 B1 * | | 9/2001 | Bongiorno et al. .......... 327/298 |
| 6,674,681 B2 * | | 1/2004 | Ishikuri ........................ 365/226 |
| 6,680,970 B1 * | | 1/2004 | Mejia ............................ 375/225 |
| 6,771,611 B1 * | | 8/2004 | Garg ............................. 370/272 |
| 6,771,694 B1 * | | 8/2004 | Baumgartner ................ 375/220 |
| 6,868,093 B1 * | | 3/2005 | Bohm et al. .................. 370/506 |
| 6,959,014 B2 * | | 10/2005 | Pohlmeyer et al. .......... 370/514 |
| 7,127,538 B1 * | | 10/2006 | Nekl ............................. 710/106 |
| 7,260,660 B1 * | | 8/2007 | Nekl ............................. 710/106 |
| 7,340,023 B1 * | | 3/2008 | Yearsley et al. ............. 375/354 |
| 7,418,031 B2 * | | 8/2008 | Jha et al. ...................... 375/225 |
| 7,463,139 B2 * | | 12/2008 | Burlak et al. ................. 340/468 |
| 7,487,273 B2 * | | 2/2009 | Kobayashi ...................... 710/62 |
| 7,620,075 B2 * | | 11/2009 | Ishimoto ....................... 370/503 |
| 7,631,229 B2 * | | 12/2009 | Ehlers ........................... 714/707 |
| 7,733,947 B2 * | | 6/2010 | Sumitomo .................... 375/219 |
| 7,848,361 B2 * | | 12/2010 | Ungermann et al. ......... 370/507 |
| 2003/0058894 A1 * | | 3/2003 | Feuerstraeter et al. ....... 370/518 |
| 2004/0054835 A1 * | | 3/2004 | Prihadi et al. ................ 710/305 |
| 2007/0291887 A1 * | | 12/2007 | Ishimoto ....................... 375/371 |
| 2011/0026572 A1 * | | 2/2011 | Kitahara ....................... 375/225 |

FOREIGN PATENT DOCUMENTS

| | | | | |
|---|---|---|---|---|
| JP | 04179339 A | * | 6/1992 | |
| JP | 06291807 A | * | 10/1994 | |
| JP | 10117146 A | * | 5/1998 | |
| JP | 11275175 A | * | 10/1999 | |
| JP | 2010171840 A | * | 8/2010 | |
| WO | 2004/044827 A1 | | 5/2004 | |
| WO | WO 2006043186 A1 | * | 4/2006 | |

OTHER PUBLICATIONS

Baronti, F.; Saponara, S.; Petri, E.; Roncella, R.; Saletti, R.; Fanucci, L.; D'Abramo, P.; , "Hardware Building Blocks for High Data-Rate Fault-Tolerant In-vehicle Networking," Industrial Electronics, 2007. ISIE 2007. IEEE International Symposium on , pp. 89-94, Jun. 4-7, 2007.*

Gallo, R.; Delvai, M.; Elmenreich, W.; Steininger, A.; , "Revision and verification of an enhanced UART," Factory Communication Systems, 2004. Proceedings. 2004 IEEE International Workshop on , pp. 315-318, Sep. 22-24, 2004.*

Elmenreich, W.; , "Time-triggered smart transducer networks," Industrial Informatics, IEEE Transactions on , vol. 2, No. 3, pp. 192-199, Aug. 2006.*

Navet, N.; Song, Y.; Simonot-Lion, F.; Wilwert, C.; , "Trends in Automotive Communication Systems," Proceedings of the IEEE , vol. 93, No. 6, pp. 1204-1223, Jun. 2005.*

"Serielle Schnittstellen,", Chip Zeitschrift Fuer Mikrocomputer-Technik, No. 2, Vogel Verlag, pp. 142-145 (Feb. 1983).

Grill, W. "Synchronizing Controller Detects Baud Rate," Electrical Design News, Cahners Publg. Co., p. 99 (Mar. 2, 1998).

* cited by examiner

INTEGRATED CIRCUIT WITH LIN-PROTOCOL TRANSMISSION

The invention relates to an integrated circuit having a system base chip of the kind usually provided for performing transmitting and/or receiving functions at a node that is coupled to a vehicle data bus, to an interface circuit that is intended to run a data protocol for the vehicle bus and to a serial/parallel converter that converts the data that is transmitted onto the data bus in serial form into parallel data that can be subjected to further processing at the reception end.

A problem that always exists with the asynchronous transmission of data is that a receiver has to set itself to the clock frequency at which the data is transmitted along the data bus. In what is called the LIN (Local Interconnect Network) protocol for example, which is intended for vehicles, the data is transmitted from a master node to slave nodes, the slave nodes being able to synchronize themselves with the rate at which the data is transmitted.

To enable synchronization of this kind to take place to the data clock rate, the slave nodes have to be capable of recognizing certain symbols that differ from those employed by a standard SCI/UART (Serial Communication Interface/Universal Asynchronous Receiver Transmitter) interface. This latter type of interface is one that is used as standard for serial data transmission.

Hence, there is the problem that a user who wishes to make use of automatic synchronization to the clock rate cannot use a standard SCI/UART interface but has to specially adapt the interface. What is required for this purpose is a specially adapted microcontroller that is provided as an external component and that has to assume responsibility for essential functions.

The consequence this has is that both the interface circuit and an externally provided microcontroller have to be specially adapted to suit the requirements.

It is an object of the invention to specify an integrated circuit that is suitable for general-purpose use and is capable of performing the functions described above as a self-contained unit, i.e. with no external microcontroller.

This object is achieved by virtue of the features of claim 1:
An integrated circuit having
a system base chip that has basic functions for a transmitting and/or receiving system for a vehicle data bus, namely at least a system voltage supply, a system reset and a monitoring function,
an interface circuit that, in a self-contained fashion, runs at least parts of a data bus protocol, and in particular the LIN (Local Interconnect Network) protocol, that performs detection of the bit-rate of received data, and that is capable of passing on at least one received or transmitted byte,
a serial/parallel converter that makes use in its conversion of the bit-rate detected by the interface circuit.

The integrated circuit according to the invention provides, in essence, three functional blocks. On the one hand, it provides the basic functions of a system base chip of the kind that is normally provided for transceivers for vehicle data bus systems. These basic functions comprise at least a system voltage supply, a system reset and a monitoring function such as, for example, a watchdog. The integrated circuit further comprises an interface circuit that, in a self-contained fashion, runs at least parts of a data bus protocol, and in particular the LIN (Local Interconnect Network) protocol. This interface circuit is capable of performing bit-rate detection in a self-contained fashion. It is also capable of passing on at least one byte that is received or is to be transmitted, i.e. of passing on a byte that has been received from the data bus to an external unit, to a microcontroller for example, or of receiving a byte from the latter and transmitting it along the data bus. The integrated circuit further comprises a serial/parallel converter that makes use in its conversion of the bit-rate detected by the interface circuit.

An essential point in this case is that the integrated circuit performs the functions described above in a self-contained fashion, i.e. can in particular carry out the bit-rate detection without an external microcontroller. It is true that a microcontroller of this kind is generally provided in applications, but it is not involved in the bit-rate detection and therefore does not have to be specially adapted for it. Hence, any available microcontroller can be used even when it is not, in itself, suitable for bit-rate detection.

Because of the high integration of the circuit and the particularly beneficial combination of functions, another advantage is that the present circuit performs all the functions that have to be proven and certified for use on a data bus. For this reason, other elements that are employed outside the integrated circuit according to the invention do not have to be certified separately.

In an embodiment of the invention that is detailed in claim 2, there is also provided in the integrated circuit an R/C oscillator that acts as a clock-signal source for the circuit elements provided in the integrated circuit and that also acts as a timebase for the bit-rate detection.

Advantageously, the clock signal generated by the R/C oscillator may also be provided to circuit elements outside the integrated circuit, for which provision is made in a further embodiment of the invention detailed in claim 3. It may with particular advantage be used for an externally provided microprocessor.

As provided for by further embodiments of the invention detailed in claim 4, the interface circuit may also receive and transmit not only individual bytes but also complete messages that are transmitted along the data bus. Such data may, if required, be buffer-stored in the interface circuit.

The integrated circuit according to the invention is thus capable of general-purpose use even as a system base chip with interface and serial/parallel conversion for complete message transmission.

As already explained above, the data may be transmitted along the data bus serially, in particular under the SCI/UART interface (Serial Communication Interface/Universal Asynchronous Receiver Transmitter) standard. The serial/parallel converter in the integrated circuit is then advantageously so arranged, as detailed in claim 6, that it receives the data under this transmission standard and converts it into parallel data, or vice versa.

These and other aspects of the invention are apparent from and will be elucidated with reference to the embodiments described hereinafter.

In the drawings:

The sole FIGURE of the drawing shows in a block circuit diagram an integrated circuit 1 according to the invention and a microcontroller 7 provided outside this integrated circuit 1.

The invention relates solely to the integrated circuit 1, which is capable of performing a plurality of different functions in a self-contained fashion and which has for this purpose various blocks of circuitry that will be explained in what follows.

For this purpose, the integrated circuit 1 is so constructed that it can perform certain functions without the externally provided microcontroller 7, which latter in turn does not have to be specially adapted to the functions performed by the integrated circuit 1.

The integrated circuit 1 comprises as it were a system base chip of the kind provided in vehicle data bus systems. A system base chip of this kind provides certain system functions, of which the integrated circuit according to the invention covers at least a system voltage supply, a system reset and a monitoring function, in particular a watchdog.

For this purpose, there is provided in the integrated circuit 1 shown in FIG. 1 a voltage regulator 3 that converts a voltage BAT originating from a vehicle battery (not shown) into a regulated voltage VCC. On the one hand, this regulated voltage is made use of within the integrated circuit 1 but it may also be used for external system components such, for example, as the microcontroller 7.

The voltage controller 3 also supplies a reset signal RST that may likewise be employed both in the integrated circuit 1 and, for example, in the microcontroller 7.

A monitoring function, that may, for example, take the form of a watchdog, is implemented in the block of circuitry marked 2 in the FIGURE, which also takes responsibility for other duties that will be explained below. The watchdog may supply an interrupt signal that is made available to the microcontroller 7.

The integrated circuit according to the invention further comprises an interface circuit that on the one hand is capable of running, in a self-contained fashion, at least parts of a data-bus protocol. In the embodiment shown in the FIGURE, it is to be assumed that this is the LIN protocol, under whose rules data is transmitted onto a data bus that is merely indicated in the FIGURE. The LIN (Local Interconnect Network) protocol makes provision for the data to be transmitted serially, essentially under the rules of the SCI/UART interface (Serial Communication Interface/Universal Asynchronous Receiver Transmitter) standard. There are therefore provided in the integrated circuit 1 shown in the FIGURE a block of circuitry 4 and a block of circuitry 5, which blocks, in essence, run the LIN protocol for data transmission. The block of circuitry 4 may also be referred to as a transceiver and is used to convert the analog data signal on the LIN line into a digital data signal and vice versa. The block of circuitry 5 is used to detect the bit-rate in use on the LIN bus.

Provided in the LIN (Local Interconnect Network) protocol is a header that allows systems that receive data on the data bus to establish the bit-rate at which the data is transmitted and to synchronize themselves to it. This bit-rate detection facility is often provided externally, i.e. is performed by means of the microcontroller 7, for example. This however calls for the microcontroller 7 to be specially adapted. In the integrated circuit 1 according to the invention, the bit-rate detection is provided in a separate block of circuitry 5 to which the transceiver 4 is coupled. The transceiver 4, when it receives a header of the kind mentioned, passes it on to the bit-rate detection facility 5, which detects the bit-rate by reference to a clock signal that is supplied by an R/C oscillator 6.

The particular advantage of this arrangement within the integrated circuit 1 is that the microcontroller 7 does not have to be used for this operation and consequently does not have to be adapted for this function.

As soon as a valid header has been recognized by the LIN (Local Interconnect Network) protocol 4, an appropriate measuring process is initiated by means of the bit-rate detection facility 5 and the bit-rate is set accordingly for continuing reception.

Both the transceiver 4 and the bit-rate detection circuit 5 are capable of receiving or transmitting, and passing on as appropriate, individual bytes. If, for example, once bit-rate detection has taken place, such a byte is received by the transceiver 4, it is passed on to the bit-rate detection facility 5 and by the latter to the block of circuitry 2 in which is provided, as well as the monitoring functions explained above, a serial/parallel converter. By means of this converter, the data received serially is converted into parallel data. The data received serially is generally transmitted under the SCI/UART (Serial Communication Interface/Universal Asynchronous Receiver Transmitter) interface standard. The data that has been converted into parallel form is transmitted to an external unit, e.g. the microcontroller 7, via a data bus that is identified as SPI in the FIGURE.

The clock signal generated by the R/C oscillator, which is identified as Clock in the FIGURE, is used both for the block of circuitry 2 containing the serial/parallel converter and the watchdog circuit and, advantageously, for the externally provided microcontroller 7. This signal is also used as a timebase for the bit-rate detection.

The essential advantage of the integrated circuit 1 according to the invention is, in essence, that, in a self-contained fashion, it is capable of provided certain watchdog functions, of running at least parts of the data transmission protocol, meaning the LIN (Local Interconnect Network) protocol in the present case, of transmitting and receiving individual items of data and of employing serial/parallel conversion of the data. The integrated circuit is able to perform bit-rate detection in a self-contained fashion in this case and to make use thereof, where required, for the functions described above. The integrated circuit 1 is thus capable of general-purpose use and can be combined with any desired external components, which do not have to be specially adapted to the functions described. In particular, the microcontroller 7 may be a general-purpose microcontroller that does not have to be specially modified for, for example, the bit-rate detection.

The invention claimed is:
1. An integrated circuit comprising:
a base chip including one or more circuits configured to
  receive a vehicle battery voltage;
  convert the vehicle battery voltage to a regulated voltage;
  provide the regulated voltage as an output of the integrated circuit;
  monitor the vehicle battery voltage;
  provide a reset signal in response to the monitoring of the vehicle battery voltage;
  receive analog signals from a serial communication interface/universal asynchronous receiver transmitter (SCI/UART) interface, the analog signals corresponding to data formatted for a Local Interconnection Network (LIN) protocol;
  identify individual bytes from a digital data signal;
  identify a LIN protocol header from at least one of the individual bytes;
  detect a bit rate for the received analog signals in response to the detected LIN protocol header and with reference to a clock signal;
  convert the analog signals to a digital data signal in response to the detected bit rate;
  perform a serial to parallel conversion on the digital data signal; and
  provide the parallel-converted digital data signal as an output of the integrated circuit.

2. The integrated circuit of claim 1, wherein the one or more circuits are further configured to
receive data from a parallel bus input to the integrated circuit;
convert the data from the parallel bus input to a serial form; and
transmit the serial form of the data from the parallel bus input on the SCI/UART interface in response to the detected bit rate.

3. The integrated circuit of claim 1, wherein the one or more circuits are further configured to provide a watchdog function and in response to the watchdog function provide an interrupt as an output of the integrated circuit.

4. The integrated circuit of claim 1, wherein the base chip further includes a resistor-capacitor (RC) clock generation circuit that is configured to provide the clock signal.

* * * * *